(12) United States Patent  
Brinkrolf

(10) Patent No.: US 6,464,605 B2  
(45) Date of Patent: Oct. 15, 2002

(54) ENDLESS BELT FOR A TRACK TYPE TRACTOR

(75) Inventor: Wilhelm Brinkrolf, Marienfelder (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/471,046

(22) Filed: Dec. 22, 1999

(65) Prior Publication Data

US 2002/0055405 A1 May 9, 2002

(51) Int. Cl.[7] ................................................. F16H 7/02
(52) U.S. Cl. ....................................................... 474/148
(58) Field of Search ................................. 474/153, 148, 474/901, 242–245; 305/107–110, 165, 178–200

(56) References Cited

U.S. PATENT DOCUMENTS

| 1,317,650 | A | * | 9/1919 | Holt | 305/194 |
|---|---|---|---|---|---|
| 1,377,450 | A | * | 5/1921 | Whipple | 474/236 |
| 2,375,065 | A | | 5/1945 | Askue | |
| 3,186,536 | A | | 6/1965 | Hinchcliffe | |
| 4,015,484 | A | | 4/1977 | Taylor | |
| 4,035,036 | A | * | 7/1977 | Boggs et al. | 305/57 |
| 4,225,036 | A | | 9/1980 | Michael | |
| 4,573,563 | A | | 3/1986 | Delhaes | |
| 4,601,685 | A | | 7/1986 | Delhaes | |
| 5,205,399 | A | | 4/1993 | Millhollin | |
| 5,409,305 | A | * | 4/1995 | Nagorcka | 305/21 |
| RE37,174 | E | * | 5/2001 | Grawey et al. | 180/9.21 |

* cited by examiner

Primary Examiner—David A. Bucci  
Assistant Examiner—Vicky A. Johnson  
(74) Attorney, Agent, or Firm—Maginot Addison & Moore; Jeff A Greene

(57) ABSTRACT

A track assembly includes a frame. The track assembly also includes a drive wheel and an idler wheel rotateably secured to the frame. The track assembly further includes an endless belt having an inner surface and an outer surface. The endless belt is disposed around the drive wheel and the idler wheel. The track assembly also includes a guide block secured to the inner surface of the endless belt. The track assembly further includes a first roller rotateably secured to the guide block.

18 Claims, 3 Drawing Sheets

ENDLESS BELT FOR A TRACK TYPE TRACTOR

TECHNICAL FIELD OF THE INVENTION

The present invention relates generally to track type tractors, and more particular to an endless belt for a track type tractor.

BACKGROUND OF THE INVENTION

Track type or track-laying tractors (hereinafter referred to as a "tractor") have a track assembly that includes an endless belt which forms a loop around a drive wheel, a number of mid-rollers, and an idler wheel. The drive wheel, idler wheel, and each mid-roller has a guide channel defined therein. The endless belt has an inner and an outer surface. The outer surface of the endless belt typically has a number of lugs extending therefrom. The inner surface of the endless belt typically has a number of guide blocks extending therefrom. The endless belt is entrained around the drive wheel, the idler wheel, and the mid-rollers so that the lugs extend outwardly relative to the drive wheel, the idler wheel, and mid-rollers while the guide blocks extend inwardly thereto.

During use of the tractor, the drive wheel rotates and engages the endless belt thereby causing the endless belt to rotate around a path defined by the drive wheel and the idler wheel. The rotation of the endless belt causes the lugs extending therefrom to engage the ground and propel the tractor over the ground to perform various work functions.

In addition, the aforementioned rotation of the endless belt causes each of the guide blocks extending therefrom to pass through the guide channel defined in the drive wheel, the idler wheel, and each of the mid-rollers. Having the guide blocks pass through the guide channels ensures that the endless belt remains entrained around the drive wheel, the idler wheel, and the mid-rollers. However, as the endless belt rotates in the above described manner, the guide blocks can come into contact with the drive wheel, the idler wheel, and the mid-rollers. The contact between the guide blocks and the drive wheel, the idler wheel, and the mid-rollers is a drawback since it can cause excessive wear on these components and thus increase the maintenance cost of the tractor.

What is needed therefore is an endless belt for a tractor which overcomes the above-mentioned drawback.

DISCLOSURE OF THE INVENTION

In accordance with a first embodiment of the present invention, there is provided an endless belt for a track type tractor. The endless belt includes a belt carcass configured to be disposed around an idler wheel and a drive wheel of the track type tractor. The endless belt also includes a guide block extending from an inner surface of the belt carcass. The endless belt also includes a first roller rotateably secured to the guide block so that the first roller can rotate relative to the guide block.

In accordance with a second embodiment of the present invention, there is provided a track assembly for a track type tractor. The track assembly includes a frame. The track assembly also includes a drive wheel and an idler wheel rotateably secured to the frame. The track assembly further includes an endless belt having an inner surface and an outer surface. The endless belt is disposed around the drive wheel and the idler wheel. The track assembly also includes a guide block secured to the inner surface of the endless belt. The track assembly further includes a first roller rotateably secured to the guide block.

In accordance with a third embodiment of the present invention, there is provided an endless belt for a track type tractor. The endless belt includes a belt carcass having a longitudinal axis. The belt carcass is configured such that the belt carcass is disposable around an idler wheel and a drive wheel of the track type tractor. The endless belt also includes a guide block extending from an inner surface of the belt carcass. The endless belt further includes a first roller rotateably secured to the guide block so that the first roller can rotate relative to the guide block around an axis of rotation. The guide block has a width $W_1$. The first roller has a diameter $D_1$. The diameter $D_1$ of the first roller is greater than the width $W_1$ of the guide block such that a portion of the first roller extends past an edge of the guide block. The axis of rotation of the first roller is parallel to the longitudinal axis of the belt carcass.

BEST MODE FOR CARRYING OUT THE INVENTION

Figure 1:
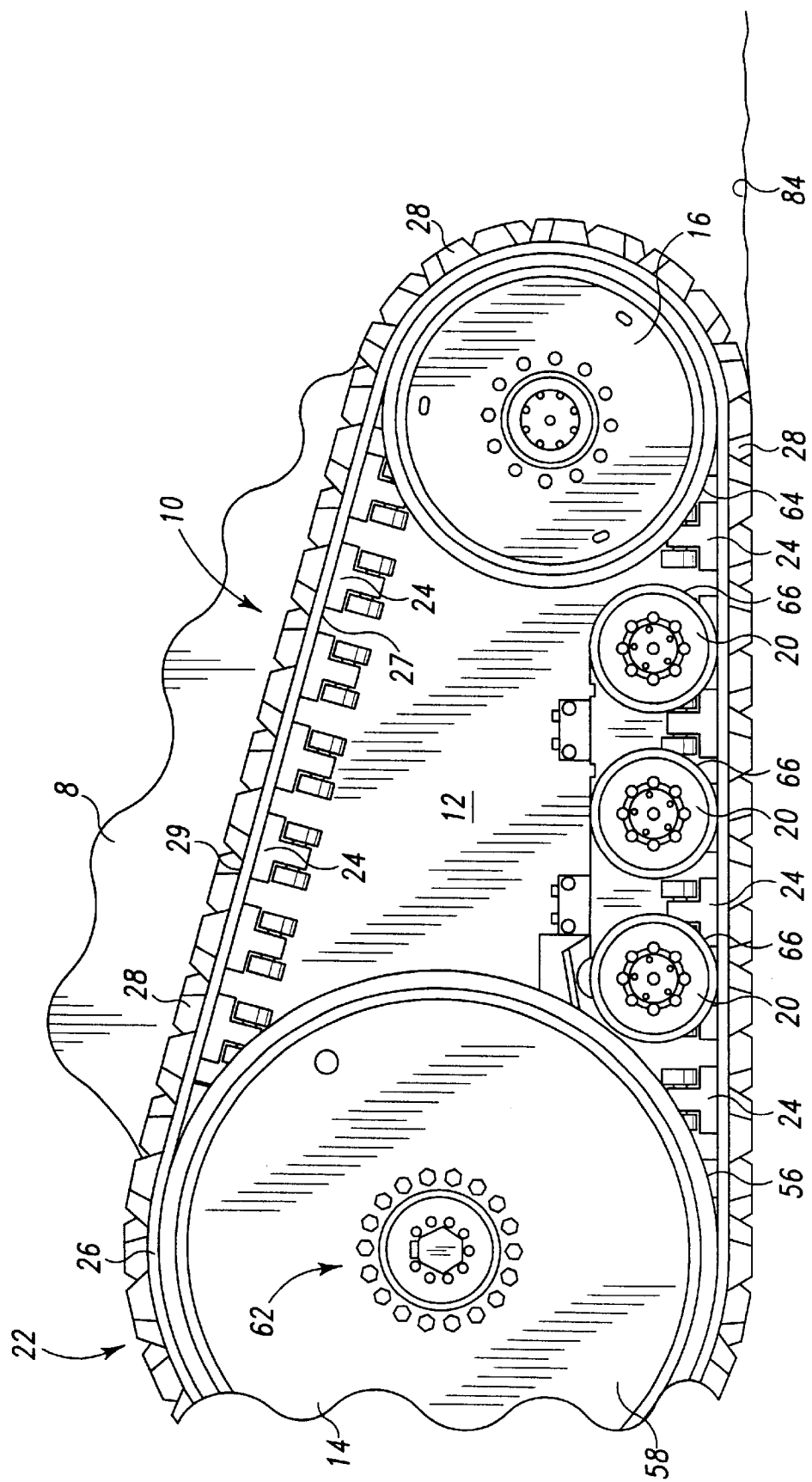
FIG. 1 is a side fragmentary view of a track assembly of a tractor which incorporates features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
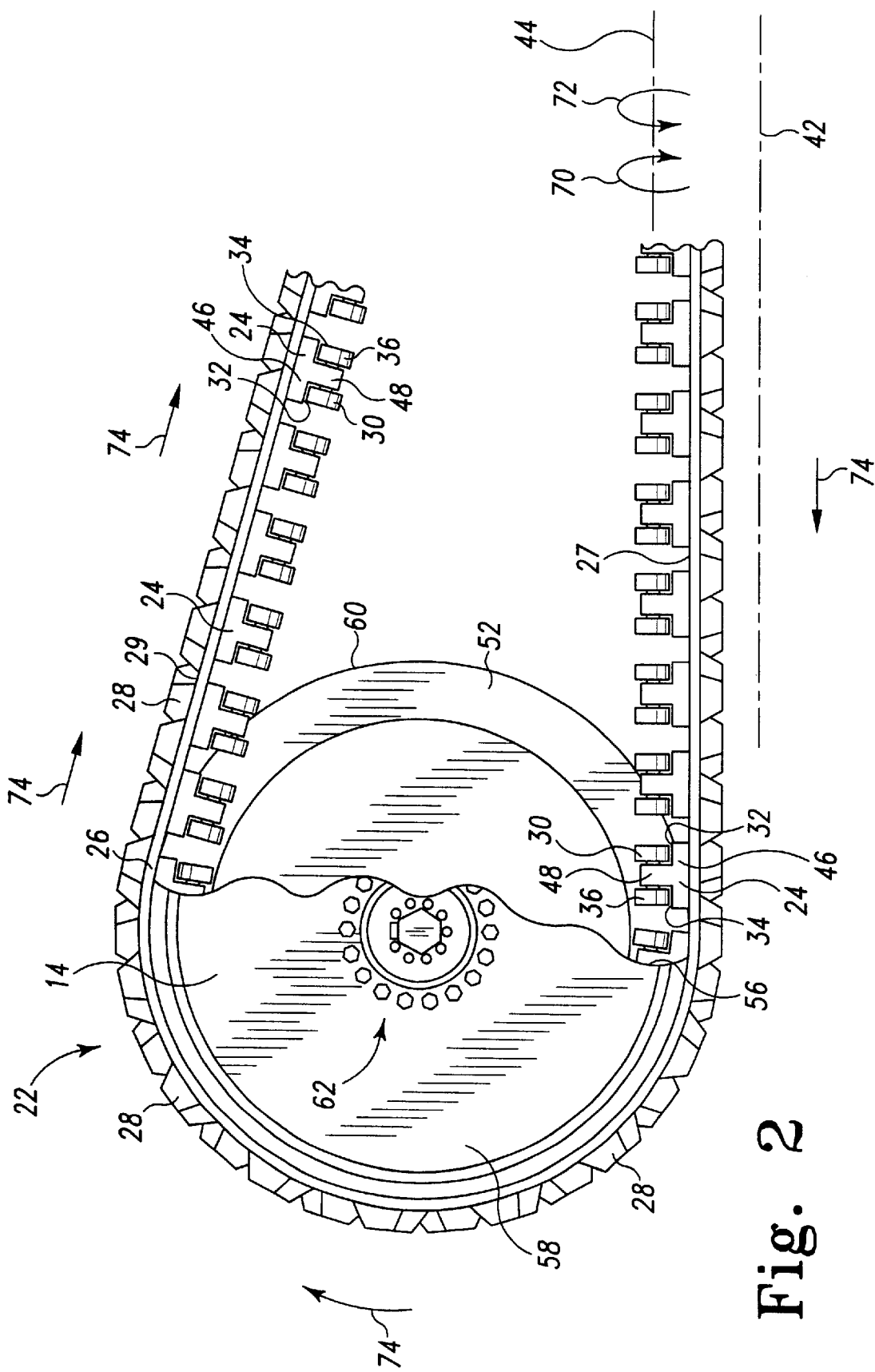
FIG. 2 is a fragmentary side elevational view of the track assembly of FIG. 1 showing the drive wheel of the track assembly and a number of guide blocks and rollers being advanced through a guide channel defined in the drive wheel.
Figure 3:
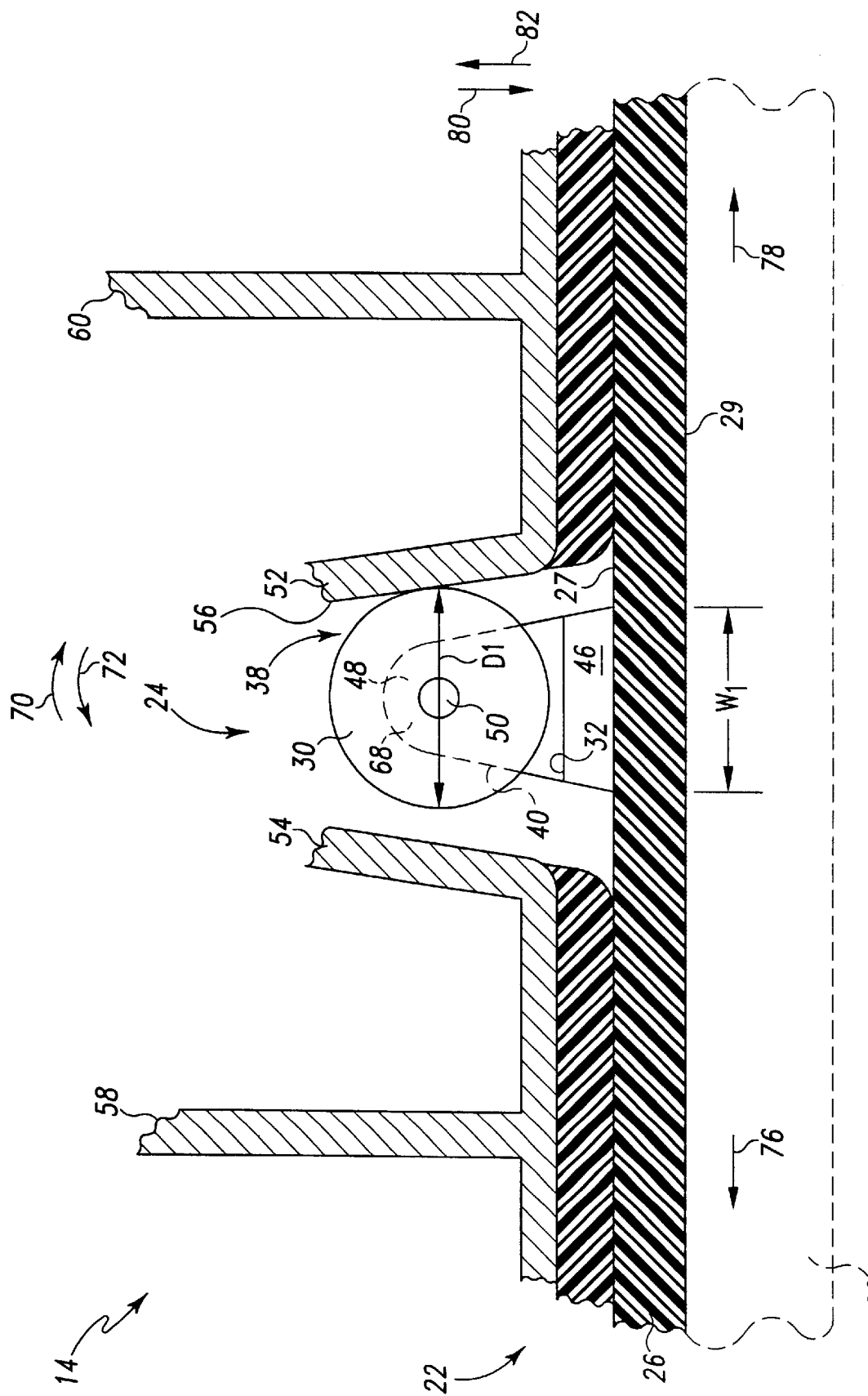
FIG. 3 is a fragmentary cross sectional view of the drive wheel of FIG. 2 showing a guide block and a roller positioned within the guide channel of the drive wheel.

Referring now to FIGS. 1, 2, and 3 there is shown a track assembly 10 of a tractor 8 (note that only a fragment of the tractor 8 is shown) that incorporates the features of the present invention therein. It should be appreciated that while only one track assembly is shown in FIG. 1, tractor 8 has two track assemblies. The second track assembly of tractor 8 is substantially identical to, and functions in a substantially identical manner as, track assembly 10. Therefore, the following description of track assembly 10 is applicable to the second track assembly of tractor 8. As a result, a detailed description of the second track assembly of tractor 8 will not be provided herein.

Track assembly 10 includes a frame 12, a drive wheel 14, an idler wheel 16, and a number of mid-rollers 20. Track assembly 10 also includes a endless belt 22 disposed around drive wheel 14, idler wheel 16, and mid-rollers 20.

Drive wheel 14 and idler wheel 16 are rotatably secured to frame 12. In addition, each mid-roller 20 is rotatably secured to frame 12. Drive wheel 14 is mechanically coupled to an engine (not shown) of tractor 8.

Drive wheel 14 includes a first half 58 and a second half 60 (see FIG. 2) attached to one another in an opposing relationship via a hub assembly 62. Note that first half 58 and second half 60 do not rotate relative to one another but rather rotate as a unit. As shown in FIG. 3, first half 58 includes a radially extending wall segment 54. In addition, second half 60 includes a radially extending wall segment 52. Wall segments 52 and 54 are positioned in an opposing relationship relative to one another so that wall segments 52 and 54 define an annular guide channel 56 which extends along the circumference of drive wheel 14.

It should be understood that idler wheel 16 is constructed in a similar manner as that described above for drive wheel 14. In particular, idler wheel 16 also has a guide channel 64 defined therein which extends along the circumference of idler wheel 16. Guide channel 64 defined in idler wheel 16 is substantially identical to guide channel 56 defined in drive wheel 14 and therefore will not be further described herein.

It should also be understood that each mid-roller 20 is constructed in a similar manner as that described above for drive wheel 14. In particular, each mid-roller 20 also as a guide channel 66 defined therein which extends along the circumference of each mid-roller 20. The guide channel 66 defined in each mid-roller 20 is substantially identical to guide channel 56 defined in drive wheel 14 and therefore will not be further described herein.

Endless belt 22 includes a belt carcass 26 having an inner surface 27 and an outer surface 29. Inner surface 27 has a number of guide blocks 24 extending therefrom. Outer surface 29 has a number of lugs 28 extending therefrom. Endless belt 22 forms a loop around drive-wheel 14, idler wheel 16, and mid-rollers 20 as shown in FIG. 1.

As shown more clearly in FIGS. 2 and 3, each guide block 24 of endless belt 22 includes a base 46 attached to inner surface 27 of belt carcass 26. Each guide block 24 also includes a wall portion 48 attached to, and extending from, base 46. Base 46 and wall portion 48 cooperate to define a pair of cut out portions 32 and 34 (see FIG. 2) in each guide block 24.

Still referring to FIGS. 2 and 3, each guide block 24 has attached thereto a pair of rollers 30 and 36. In particular, as shown more clearly in FIG. 3, roller 30 is rotateably attached to guide block 24 with an axle 50 that extends outwardly from a side 68 of wall portion 48. Attaching roller 30 in the above described manner results in roller 30 being positioned within cut out portion 32 of guide block 24. Furthermore, attaching roller 30 in the above described manner results in roller 30 being able to rotate relative to guide block 24 and belt carcass 26. Specifically, roller 30 is able to rotate around an axis of rotation 44 (see FIG. 2) in the directions indicated by arrows 70 and 72. It should be appreciated that attaching guide block 24 to belt carcass 26, and then rotateably attaching roller 30 to guide block 24 in the above described manner results in the axis of rotation 44 of roller 30 being parallel with the longitudinal axis 42 of endless belt 22 (see FIG. 2).

As shown in FIG. 3, each guide block 24 has a width $W_1$. In addition, each roller 30 and 36 has a diameter $D_1$. Diameter $D_1$ is greater than width $W_1$ so that a portion 38 of each roller 30 and 36 extends past an edge 40 of each guide block 24.

Roller 36 is rotateably attached to guide block 24 is a similar manner as roller 30. Specifically, roller 36 is rotateably attached to guide block 24 with an axle (not shown) which is identical to axle 50. The axle supporting roller 36 extends outwardly from a side of wall portion 48 which is opposite to side 68. Attaching roller 36 in the above described manner results in roller 36 being positioned within cut out portion 34 of guide block 24 as shown in FIG. 2. Furthermore, attaching roller 36 in the above described manner results in roller 36 being able to rotate relative to guide block 24 and belt carcass 26. Specifically, roller 36 is able to rotate around axis of rotation 44 (see FIG. 2) in the directions indicated by arrows 70 and 72. As with roller 30, attaching guide block 24 to belt carcass 26, and then rotateably attaching roller 36 to guide block 24 in the above described manner results in the axis of rotation 44 of roller 36 being parallel with the longitudinal axis 42 of endless belt 22. It should be understood that each guide block 24 is constructed in a substantially identical manner as above. In addition, each guide block 24 has a pair of rollers 30 and 36 rotateably attached thereto in a manner substantially identical as described above.

Industrial Applicability

During use of tractor 8, drive wheel 14 rotates and engages endless belt 22 thereby causing endless belt 22 to rotate around a path defined by drive wheel 14 and idler wheel 16. For example, endless belt 22 can rotate around the path defined by drive wheel 14 and idler wheel 16 in the direction indicated by arrows 74 (see FIG. 2). Rotation of endless belt 22 cause lugs 28 thereof to engage ground 84 thereby propelling tractor 8 over ground 84 to perform various work functions.

As endless belt 22 moves in the direction indicated by arrows 74 guide blocks 24 are also advanced in the direction of arrows 74. Guide blocks 24 are positioned on belt carcass 26 relative to guide channel 56 so that guide blocks 24 are advanced through guide channel 56 as endless belt 22 moves in the direction of arrows 74. Moreover, it should be understood that guide blocks 24 are positioned on belt carcass 26 relative to guide channel 64 defined in idler wheel 16 and guide channels 66 defined in each mid-roller 20 so that the guide blocks 24 are also advanced through these guide channels as endless belt 22 moves in the direction of arrows 74. Having guide blocks 24 advanced through the aforementioned guide channels aids in keeping endless belt 22 entrained around drive wheel 14, idler wheel 16, and mid-rollers 20.

As shown in FIG. 3, as a guide block 24 is advanced through guide channel 56, belt carcass 26 can be urged in the directions indicated by arrows 76 and 78 relative to drive wheel 14. For example, endless belt 22 may come into contact with an obstacle, such as a rock, which results in belt carcass 26 being urged in the direction indicated by arrow 78. Urging belt carcass 26 in the direction indicated by arrow 78 results in roller 30 (and roller 36, although roller 36 is not shown in FIG. 3) coming into contact with radially extending wall segment 52. In particular, portion 38 of roller 30 comes into contact with radially extending wall segment 52.

In addition, while roller 30 is in contact with radially extending wall segment 52, belt carcass 26 may be urged in the directions indicated by arrows 80 and 82 relative to drive wheel 14. Urging belt carcass 26 in the direction indicated by arrow 80 while roller 30 is in contact with radially extending wall segment 52 causes roller 30 to rotate relative to guide block 24 in the direction indicated by arrow 72. On the other hand, urging belt carcass 26 in the direction indicated by arrow 82 while roller 30 is in contact with radially extending wall segment 52 causes roller 30 to rotate relative to guide block 24 in the direction indicated by arrow 70.

Note that when roller 36 is in contact with radially extending wall segment 52, roller 36 functions in an identical manner as described above for roller 30. Furthermore, it should be understood that when belt carcass 26 is urged in the direction indicated by arrow 76 so that rollers 30 and 36 are in contact with radially extending wall segment 54, rollers 30 and 36 function in a similar manner. Specifically, when rollers 30 and 36 are in contact with radially extending wall segment 54 and belt carcass 26 is urged in the direction indicated by arrow 80, rollers 30 and 36 rotate in the direction indicated by arrow 70. However, when rollers 30 and 36 are in contact with radially extending wall segment 54 and belt carcass 26 is urged in the direction indicated by arrow 82, rollers 30 and 36 rotate in the direction indicated by arrow 72. Additionally, it should be appreciated that each guide block 24 and each pair of rollers 30 and 36 of track assembly 10 function in an identical manner as described above.

It should be appreciated that having rollers 30 and 36 in contact with radially extending wall segments 52 and 54 rather than in direct contact with guide block 24 is an important aspect of the present invention. In particular, having rollers 30 and 36 in contact with radially extending wall segments 52 and 54 decreases the friction generated between endless belt 22 and drive wheel 14. In addition, having rollers 30 and 36 attached to each guide block 24 decreases the friction generated between endless belt 22 and mid-rollers 20, and between endless belt 22 and idler wheel 16. This is true since rollers 30 and 36 rotate and allow endless belt 22 to move relative to drive wheel 14, idler wheel 16, and mid-rollers 20 with significantly less friction. This is in contrast to other track assembly designs which result in the guide blocks being directly scraped against the drive wheel, the idler wheel, and the mid-rollers when the belt carcass is urged in a particular direction. Having the guide blocks periodically scrapped against the aforementioned components creates a great deal of friction and causes the track assembly to wear excessively.

The present invention addresses the aforementioned problem by substantially decreasing the amount of friction generated between endless belt 22 and drive wheel 14, idler wheel 16, and mid-rollers 20. As a result, the useful life of track assembly 10 is extended thereby decreasing the maintenance costs of tractor 8.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An endless belt for a track type tractor, comprising:
   a belt carcass having a longitudinal axis, said belt carcass configured to be disposed around an idler wheel and a drive wheel of said track type tractor;
   a guide block extending from an inner surface of said belt carcass; and
   a first roller rotateably secured to said guide block so that said first roller can rotate relative to said guide book about an axis which is parallel to the longitudinal axis of said belt carcass.

2. The endless belt of claim 1, wherein:
   said guide block has a first cut out portion defined therein, and
   said first roller is secured to said guide block so that said first roller is positioned within said first cut out portion.

3. The endless belt of claim 2, wherein said guide block has a second cut out portion defined therein, further comprising:
   a second roller rotateably secured to said guide block so that said second roller is positioned within said second cut out portion.

4. The endless belt of claim 1, wherein:
   said guide block has a width $W_1$,
   said first roller has a diameter $D_1$, and
   said diameter $D_1$ is greater than width $W_1$ so that a portion of said first roller extends past an edge of said guide block.

5. The endless belt of claim 1, further comprising:
   a number of lugs extending from an outer surface of said belt carcass.

6. The endless belt of claim 1, wherein:
   said guide block includes (i) a base secured to said inner surface of said belt carcass and (ii) a wall portion extending from said base, and
   said first roller is rotateably secured to said wall portion.

7. The endless belt of claim 6, further comprising:
   an axle member extending from said wall portion,
   wherein said first roller is rotateably secured to said axle member.

8. A track assembly for a track type tractor, comprising:
   a frame;
   a drive wheel rotateably secured to said frame;
   an idler wheel rotateably secured to said frame;
   an endless belt having an inner surface, an outer surface and a longitudinal axis, said endless belt being disposed around said drive wheel and said idler wheel;
   a guide block secured to said inner surface of said endless belt; and
   a first roller rotateably secured to said guide block about an axis which is parallel to the longitudinal axis of said endless belt.

9. The track assembly of claim 8, further comprising:
   a number of mid-rollers rotateably secured to said frame so that said mid-rollers are interposed between said drive wheel and said idler wheel.

10. The track assembly of claim 8, wherein:
    said drive wheel includes a first pair of radially extending wall segm ents,
    said first pair of radially extending wall segments define a first guide channel in said drive wheel, and
    said endless belt is positioned relative to said drive wheel so that (i) said first roller is advanced through said first guide channel and (ii) said first roller periodically contacts at least one of said radially extending wall segments of said drive wheel.

11. The track assembly of claim 10, wherein:
    said idler wheel includes a second pair of radially extending wall segments,
    said second pair of radially extending wall segments define a second guide channel in said idler wheel, and
    said endless belt is positioned relative to said idler wheel so that (i) said first roller is advanced through said second guide channel and (ii) said first roller periodically contacts at least one of said radially extending wall segments of said idler wheel.

12. The track assembly of claim 8, wherein:
    said guide block has a first cut out portion defined therein, and
    said first roller is secured to said guide block so that said first roller is positioned within said first cut out portion.

13. The track assembly of claim 12, wherein said guide block has a second cut out portion defined therein, further comprising:

a second roller rotateably secured to said guide block so that said second roller is positioned within said second cut out portion.

14. The track assembly of claim 8, wherein:

said guide block has a width $W_1$, said first roller has a diameter $D_1$, and said diameter $D_1$ is greater than width $W_1$ so that a portion of said first roller extends past an edge of said guide block.

15. An endless belt for a track type tractor, comprising:

a belt carcass having a longitudinal axis, said belt carcass being configured such that said belt carcass is disposable around an idler wheel and a drive wheel of said track type tractor;

a guide block extending from an inner surface of said belt carcass; and a first roller rotateably secured to said guide block so that said first roller can rotate relative to said guide block around an axis of rotation, wherein (i) said guide block has a width $W_1$, (ii) said first roller has a diameter $D_1$, (iii) said diameter $D_1$ is greater than said width $W_1$ such that a portion of said first roller extends past an edge of said guide block, and (iv) said axis of rotation of said first roller is parallel to said longitudinal axis of said belt carcass.

16. The endless belt of claim 15, further comprising:

a number of lugs extending from an outer surface of said belt carcass.

17. The endless belt of claim 15, further comprising:

a second roller rotateably secured to said guide block so that (i) said first roller and said second roller are in an opposing relationship and (ii) said second roller can rotate relative to said guide block around said axis of rotation.

18. The endless belt of claim 17, wherein:

said guide block has a first cut out portion and a second cut out portion defined therein, said first roller is rotateably secured to said guide block such that said first roller is positioned within said first cut out portion, and said second roller is rotateably secured to said guide block such that said second roller is positioned within said second cut out portion.

* * * * *